United States Patent [19]

Sanford

[11] Patent Number: 4,918,467

[45] Date of Patent: Apr. 17, 1990

[54] RECORDING WEB DRIVE WITH ROTATING PRESSURE PAD

[75] Inventor: Herbert F. Sanford, Littleton, Colo.

[73] Assignee: Honeywell Inc., Minneapolis, Minn.

[21] Appl. No.: 213,379

[22] Filed: Jun. 30, 1988

[51] Int. Cl.[4] ........................ G01D 9/42; G01D 15/14

[52] U.S. Cl. ................................ 346/110 R; 346/136; 346/158; 355/20; 355/104; 358/302

[58] Field of Search ........... 346/160, 158, 136, 110 V, 346/110 R; 355/20, 104, 117; 358/302

[56] References Cited

U.S. PATENT DOCUMENTS 4,134,668 1/1979 Coburn ................................ 346/160

4,172,259 10/1979 Lowe ................................ 346/136

4,721,967 1/1988 Roche ............................ 346/110 V

*Primary Examiner*—E. A. Goldberg

*Assistant Examiner*—Scott Rogers

*Attorney, Agent, or Firm*—Charles L. Rubow

[57] ABSTRACT

A paper drive system for a fiber optic cathode ray tube based recorder in which a rotating compliant foam pressure pad maintains the paper in intimate contact with the fiber optic faceplate. The paper web from a paper supply is gripped between a tire on the rotating pressure pad and a drive roller before passing the faceplate, and thereafter is gripped between the tire on the pressure pad and an idler roller.

11 Claims, 1 Drawing Sheet

RECORDING WEB DRIVE WITH ROTATING PRESSURE PAD

BACKGROUND OF THE INVENTION

The invention disclosed herein relates generally to apparatus for moving web type recording media past a recording region, and more particularly to a precision paper drive with a rotating pressure pad for use in hard copy recording apparatus.

Hard copy recording apparatus employing a cathode ray tube (CRT) with a fiber optic faceplate for supplying luminous signals and a light sensitive paper web moving past the faceplate is well known. In such apparatus, the fiber optic faceplate is of elongated form and produces luminous signals in the form of minute dots in a linear recording region whose length is the width of the desired record. It is necessary to maintain the recording paper in intimate contact with the recording region of the fiber optic face plate to assure accurately recorded signals. Intimate contact is necessary to properly focus the luminous dots on the paper. Since the depth of field of such an arrangement is in the order of 0.002 inches, the recorded dots become noticeably fuzzy with even small gaps between the paper and the faceplate.

In order to obtain an accurate record, it is also necessary to uniformly and precisely move the paper past the recording region. This, among other things, requires an accurate and precisely controlled drive roller and no slippage between the paper and the drive roller. Thus, it is normal to press the paper against the drive roller with a relatively hard tire.

Conventional paper drive systems in recording apparatus of the above described type have used a stationary foam pressure pad to hold the paper in intimate contact with the faceplate, and a single drive roller/pinch roller pair above the faceplate to pull the paper across the recording region. The geometry of such drive systems necessitates a relatively large border between the end of a paper segment and the beginning of a recorded area.

A large border is undesirable both because it does not fully utilize the light sensitive paper which, in the case of paper capable of producing color images, is relatively expensive, and because a large boarder may not be aesthetically pleasing. Thus, with a conventional paper drive system, if a smaller border is desired, extra trimming steps are necessary.

The applicant has devised a paper drive system which provides for borders of any desired width, thereby avoiding disadvantages of prior art paper drive systems. This paper drive system also insures an accurate record by isolating the paper in contact with the faceplate from fluctuations in paper tension on both the supply and output sides of the recording region.

SUMMARY OF THE INVENTION

The present invention is a drive system for a recording web, the drive system including a circular cylindrical pressure pad extending along its axis of symmetry, and having along its length at least two sections of compliant foam surface separated by a hard tire whose diameter is slightly smaller than the outer diameter of the foam surface. The pressure pad is mounted for rotation about its axis of symmetry, and first and second rollers rotatable about first and second axes parallel with the axis of symmetry are located at circumferentially spaced locations about the axis of symmetry. The first and second rollers are positioned with respect to the pressure pad so as to grip the recording web between the rollers and the tire on the pressure pad. Drive means may be provided for directly driving one of the rollers so as to move the web through the system. An elongated faceplate having a recording region at which is produced luminous signals to be recorded may be located between the first and second rollers and in contact with the compliant foam surface on the pressure pad for maintaining the recording web in intimate contact with the faceplate.

DESCRIPTION OF THE PREFERRED EMBODIMENT

Figure 1:
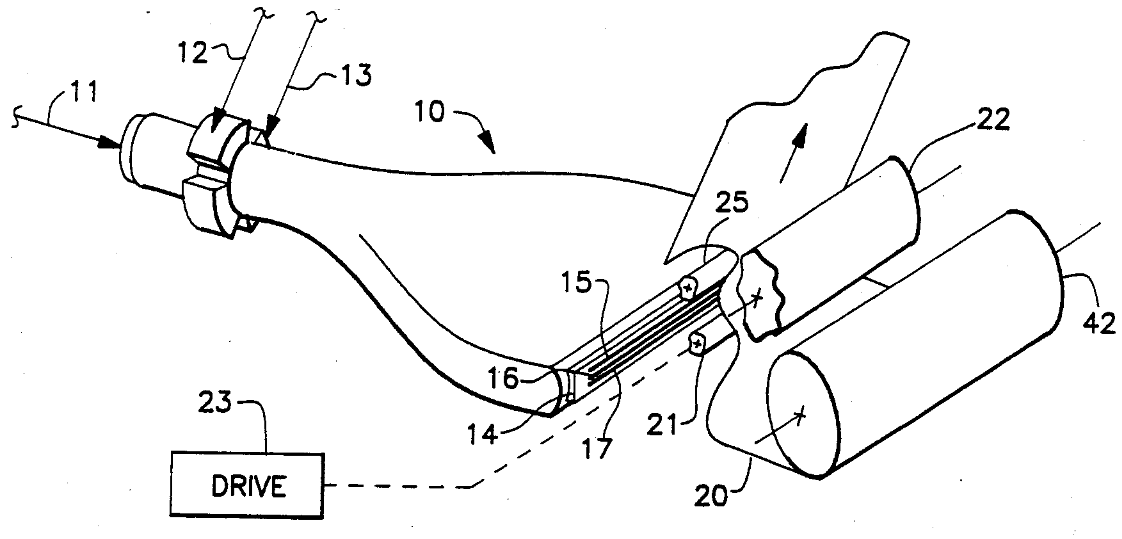
FIG. 1 is a partial perspective view partially broken away of a paper drive system in accordance with the applicant's invention in a fiber optic CRT based color hard copy recorder.

In the apparatus shown in FIG. 1, reference numeral 10 identifies a cathode ray tube which produces luminous signals in response to electrical signals supplied over conductor 11 to an electron gun in the CRT and over conductors 12 and 13 to beam deflection means of the CRT.

Reference numeral 14 identifies a fiber optic faceplate on the CRT. The faceplate consists of several million glass fiber segments a few microns in diameter fused together for transmitting luminous signals produced by phosphors in the CRT to a hard copy recording medium. As illustrated by bands 15, 16 and 17, CRT 10 may be provided with phosphors for producing three different color components which are transmitted through separate bands of optical fiber segments to the web recording medium. By appropriately synchronizing the production of color components, a continuous color image may be produced on the recording web.

The recording web which is supplied in roll form is identified by reference numeral 20. It is fed between a drive roller 21 and a circular cylindrical rotating pressure pad 22 which will be described in detail hereinafter. Pressure pad 22 has a hard tire thereon which, in corporation with drive roller 21 under the control of a drive control apparatus 23, moves the web past the recording region of faceplate 14 while maintaining intimate contact between the web and the faceplate.

After passing faceplate 14, web 20 passes between pressure pad 22 and idler roller 25 which also grips the paper between the idler roller and the tire on the pressure pad. The web then passes through developing apparatus and then to the user, as will also be described hereinafter.

Figure 3:
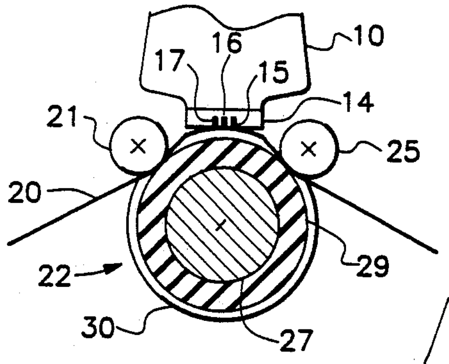
FIG. 3 is a sectional view of the rotating pressure pad and CRT of FIG. 2 taken along lines 3—3, and also showing drive and idler rollers which form part of the applicant's paper drive system.
Figure 2:
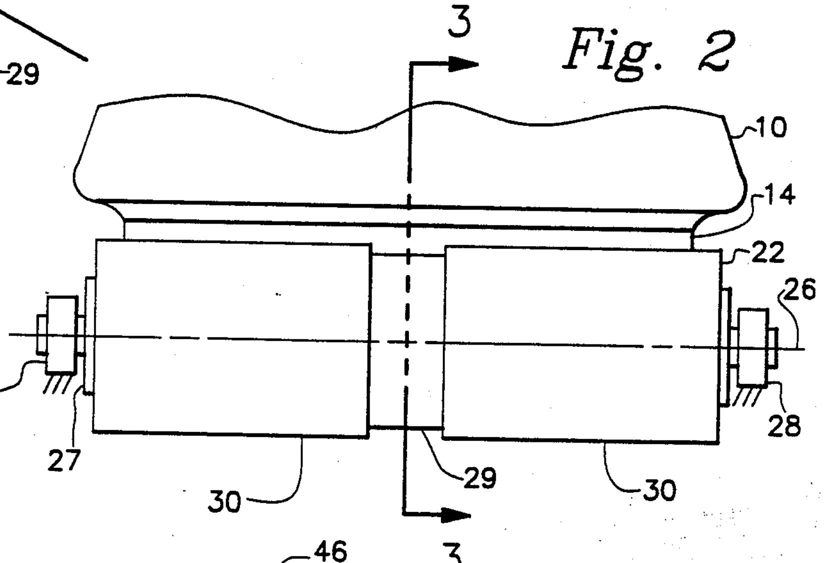
FIG. 2 is an enlarged plan view of a rotating pressure pad used in the applicant's paper drive system, showing its relationship to the fiber optic faceplate of the CRT of FIG. 1.

As in FIG. 1, in FIG. 2 and 3 the cathode ray tube, fiber optic face plate and rotating pressure pad are identified by reference numerals 10, 14 and 22. Also shown in FIG. 3 are recording regions 15–17, paper 20 and drive and idler rollers 21 and 25.

Pressure pad 22 is rotatable on its axis of symmetry 26 which is parallel with the recording region 15–17 of faceplate 14. Pressure pad 22 is constructed with a rigid core 27 extending along axis 26 rotatably carried in bearings 28 and having a hard tire 29 centrally located thereon. As shown, tire 29 has a flat outer surface thereon parallel with axis 26. However, the surface alternatively may be crowned, or trapezoidal, or may have some other suitable shape. In some drive system arrangements a non flat surface may provide improved tracking of the paper web.

On either side of tire 29 is a circular cylindrical compliant foam surface 30 which contacts the surface of faceplate 14. As can be seen from FIG. 2, the width of tire 29 along axis 26 is small compared to the length of foam surfaces 30. As can be seen from FIGS. 2 and 3, the diameter of tire 29 is slightly smaller than the diameter of foam surface 30.

As shown in FIG. 3, drive roller 21 and idler roller 25 are located closely adjacent the longitudinal edges of faceplate 14. That feature, in conjunction with the fact that pressure pad 22 rotates and that idler roller 25 is driven through tire 29, permits recording as close as desired to the end of paper 20 while permitting the end of the paper to subsequently fed between pressure pad 22 and idler roller 25 and thereafter through the developing processor and out to the user.

In addition, the provision of rollers on both the paper supply and output sides of faceplate 14 prevents any fluctuations in paper tension on either side of the paper path from being transmitted to the paper in contact with the faceplate. This feature also contributes to accuracy and sharpness of the recorded image.

Figure 4:
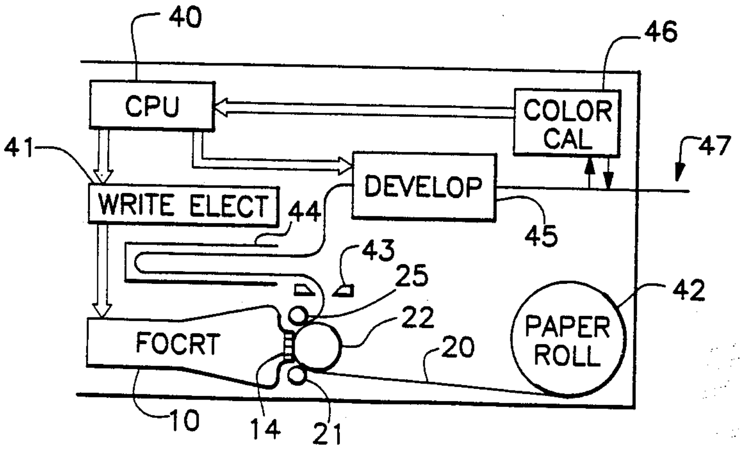
FIG. 4 is a functional illustration and block diagram of a color hard copy recorder in which the applicant's paper drive system is used.

In the recording apparatus functional block diagram of FIG. 4, the cathode ray tube, fiber optic face plate, paper web, drive roller, rotating pressure plate and idler roller are identified by the same reference numerals as in FIGS. 1–3. The luminous output of the CRT is produced under control of a central processing unit 40 and writing electronics 41. Paper 20 is fed from a paper roll 42, and passes between drive roller 21 and rotating pressure pad 22 from where it passes between faceplate 14 and pressure pad 22, and then between idler roller 25 and pressure pad 22. The paper web then passes through a cutter 43 for cutting the paper web into sheets of a desired length and then into an accumulator 44 for accommodating any differences between the speed at which the paper web is being exposed to luminous signals and the speed at which it can be processed by a developing processor 45 also operating under the control of central processing unit 40. The developed recording then passes color calibration sensors 46 and to the user as indicated at 47.

In accordance with the foregoing description, the applicant has provided a unique paper drive system featuring a rotating pressure pad. The system allows for recorded copy border of any desired width, thus minimizing waste of paper and eliminating the need for any trimming steps. The paper drive system also insures intimate contact between the paper web and the faceplate and isolates the paper in contact with the faceplate from fluctuations in paper tension in either the paper supply or output paths.

Although a particular embodiment has been shown and described in detail for illustrative purposes, a number of variations and modifications will be apparent to those of ordinary skill in the relevant arts. It is not intended that coverage be limited to the disclosed embodiment, but only by the terms of the following claims.

What is claimed:

1. A paper drive system for a hard copy recorder of the type in which a light sensitive paper web is moved past a recording region in which the paper web is exposed to luminous signals to be recorded, comprising:

a cathode ray tube with an elongated fiber optic faceplate which produces luminous signals along a linear recording region of predetermined length;

a circular cylindrical pressure pad of a length at least as great as the length of the recording region and having a hard tire of predetermined diameter located midway along the length of said pressure pad, said pressure pad further having a cylindrical compliant foam surface on either side of the tire, the outer diameter of the foam surface being slightly larger than the diameter of the tire, the combined length of the foam surface and width of the tire being at least as great as the length of the recording region;

means for mounting said pressure pad for rotation about a first axis parallel with the linear recording region and located relative to the faceplate so that only the foam surface contacts the faceplate;

a drive roller rotatable about a second axis parallel with the first axis and located on one side of the plane containing the recording region and the first axis, the drive roller being located relative to the hard tire on said pressure pad so as to grip a paper web between the tire and the drive roller;

means for rotating said drive roller; and an idler roller rotatable about a third axis parallel with the first axis on the opposite side of the plane containing the recording region and the first axis from the second axis, the idler roller further being located relative to the hard tire on said pressure pad so as to grip a paper web between the tire and the idler roller.

2. The paper drive system of claim 1 wherein said drive roller and said idler roller are located closely adjacent the long edges of the elongated fiber optic faceplate on opposite sides thereof.

3. The paper drive system of claim 1 wherein the width of the tire on said pressure pad is small relative to the length of said pressure pad.

4. The paper drive system of claim 3 wherein the tire on said pressure pad has an outer surface thereon which is flat along th first axis.

5. The paper drive system of claim 3 wherein the tire on said pressure pad has an outer surface thereon which is crowned along the first axis.

6. A hard copy recorder of the type in which a light sensitive paper web is moved past a recording region in which the paper web is exposed to luminous signals to be recorded, the hard copy recorder including a paper drive system comprising:

a circular cylindrical pressure pad of predetermined length and symmetrical about a first axis, said pressure pad having a hard tire of predetermined diameter located midway along its length and having a cylindrical compliant foam surface on either side of the hard tire, the outer surface of the compliant foam surface being slightly larger than the diameter of the tire;

means for mounting said pressure pad for rotation about the first axis;

a drive roller rotatable about a second axis parallel with the first axis and located relative to the hard tire so as to grip a paper web between said pressure pad and said drive roller;

means for rotating said drive roller;

an idler roller rotatable about a third axis parallel with the first axis and circumferentially spaced about the first axis from the second axis, the third axis being located relative to the hard tire on said pressure pad so as to grip a paper web between said pressure pad and said idler roller; and a cathode ray tube having an elongated fiber optic faceplate with a linear recording region thereon, the cathode ray tube being mounted so that the recording region is parallel with the first, second and third axes and the faceplate is positioned to contact the foam surface on the pressure pad at a location between said drive roller and said idler roller.

7. The hard copy recorder of claim 6 wherein the tire on said pressure pad has an outer surface thereon which is flat along the first axis.

8. The hard copy recorder of claim 7 wherein the tire on said pressure pad has an outer surface thereon which is crowned along the first axis.

9. The hard copy recorder of claim 6 wherein said drive roller and said idler roller are located closely adjacent the long edges of the fiber optic face plate on opposite sides thereof.

10. A paper drive system comprising;

a circular cylindrical pressure pad extending along an axis of symmetry and having along its length at least two sections of cylindrical compliant foam surface separated by a tire whose diameter is slightly smaller than the outer diameter of the foam surface;

means for mounting said pressure pad for rotation about its axis of symmetry;

a first roller rotatable about a first axis parallel with the axis of symmetry of said pressure pad and located so as to grip a paper web between the first roller and the tire on said pressure pad; and a second roller rotatable about a second axis parallel with the axis of symmetry of said pressure pad and circumferentially spaced about the axis of symmetry from the first axis, the second roller being located relative to said pressure pad so as to grip a paper web between the second roller and the tire on said pressure pad.

11. The paper drive system of claim 10 further including drive apparatus adapted to rotate said first roller about the first axis.

* * * * *